United States Patent
Cook (10) Patent No.: US 6,823,065 B1
(45) Date of Patent: Nov. 23, 2004

(54) AUTO-DIAL BUSINESS CARD SYSTEM

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 546 days.

(21) Appl. No.: 09/702,621

(22) Filed: Oct. 31, 2000

(51) Int. Cl.[7] .............................. H04M 1/00; H04M 3/00
(52) U.S. Cl. ............................ 379/357.01; 379/357.04; 379/433.09; 379/114.18; 235/380
(58) Field of Search ...................... 379/357.01–357.05, 379/112.01, 433.09, 285, 114.15–114.17, 355.03, 114.18; 235/380, 381, 386

(56) References Cited

U.S. PATENT DOCUMENTS

| | | | | |
|---|---|---|---|---|
| 4,817,136 A | * | 3/1989 | Rhoads .................. | 379/357.01 |
| 6,028,926 A | * | 2/2000 | Henderson et al. .... | 379/357.03 |
| 6,134,309 A | * | 10/2000 | Carson .................... | 379/114.2 |

* cited by examiner

Primary Examiner—Curtis Kuntz
Assistant Examiner—Alexander Jamal (57) ABSTRACT

A business card communication system and auto-dial business cards. The auto-dial business cards include business information indicia and computer readable call connection information. The computer readable call connection information is configured to permit a card holder to automatically place a call to a call destination designated by the card provider. The business card communication system comprises a processing system coupled to an interface system. The processing system is configured to process a call request from a communication device to translate an access number provided in the call request and generate call handling information that routes the call request to the business premise. The interface system is configured to receive the call request from the communication device and transmit the call handling information for the processing system. The communication device is configured to read the computer readable call connection information from the auto-dial business card and automatically generate the call request for a call to the business premise.

15 Claims, 5 Drawing Sheets

AUTO-DIAL BUSINESS CARD SYSTEM

RELATED APPLICATIONS

Not applicable

FEDERALLY SPONSORED RESEARCH OR DEVELOPMENT

Not applicable

MICROFICHE APPENDIX

It Not applicable

BACKGROUND OF THE INVENTION

1. Field of the Invention

The invention relates to telecommunications, and specifically, to a business card communication system and auto-dial business cards configured to automatically place a call to a business premise.

2. Description of the Prior Art

It is known in the art of telecommunications to provide calling cards that can be used to automatically place a call to a service provider. In a typical example, a holder of the calling card uses a card reader interface on a telephone to read information from the calling card to automatically initiate a call to the service provider. In response to receiving the call, the service provider queries the cardholder for account information and a telephone number the card holder is calling. Upon receiving the account information and telephone number, the service provider validates the account information and places a call to the telephone number for the card holder.

It is also well known that individuals and businesses use business cards to provide contact information to other individuals and customers of the business. The contact information typically includes information such as an address, telephone number, facsimile number, cell phone number, and/or email address along with the business or individuals logo. The receiver of the business card may then use the contact information to communicate with the business or individual according to the information provided on the card. For example, the receiver of the business card could dial the telephone number, cell phone number, or fax number to place a call or send a fax to the business or individual.

SUMMARY OF THE INVENTION

The present invention advances the art by providing a business card communication system and auto-dial business cards. The auto-dial business cards include business information indicia and computer readable call connection information. The computer readable call connection information is configured to automatically place a call to a call destination designated by the card provider. The call connection information could automatically place the call to any location chosen by the provider of the auto-dial business card. For example, the call connection information for one batch of auto-dial business cards could place a call to a main customer service telephone number for a business. In another example, the call connection information for another batch of auto-dial business cards could place a call to a specific employee's extension. In yet another example, the call connection information for another batch of auto-dial business cards could place a call to a parts department or service department. The business card communication system is configured to perform call connection operations and auto-dial business card account management.

The business card communication system comprises a processing system coupled to an interface system. The interface system is connected to a communication device that is configured to read the computer readable call connection information from individual auto-dial business cards and process the computer readable call connection information to automatically place a call request to a business premise. The processing system is configured to process the call request to the business premise from the communication device to translate an access number provided in the call request and generate call handling information that routes the call request to the business premise. The interface system is configured to receive the call request from the communication device and transmit the call handling information for the processing system.

A first advantage of the present invention is that it provides a convenient way for a subscriber of the auto-dial business card service to provide contact information. A second advantage of the present invention is that it provides usage tracking of the auto-dial business cards for subscribers of the auto-dial business card service. A third advantage of the present invention is that it provides the ability to multiplex a plurality of calls to a plurality of different call destinations over a single access number. For example, the same toll free access number could be used for a plurality of subscribers to the auto-dial business card service. The individual calls could be processed by the business card system to generate call handling information routing the individual calls to the appropriate call destination according to the individual auto-dial business card used to place the call. A fourth advantage of the present invention is that customers do not have to remember or dial long digit telephone number sequences.

In the context of the present invention, the first, second, third, fourth, etc. connotations used to reference the calls, the call connection information, and the call handling information are used for the purpose of differentiating between different calls, call connection information and call handling information and are not used to indicate a call sequence or processing sequence. Also in the context of the present invention, the term business premise is used for the purpose of illustrating the automatic placement of calls to a call destination using the auto-dial business cards of the present invention. Thus, the definition of a business premise is not limited to only the location of a business. The term business premise could mean any call destination for a call placed using one of the auto-dial business cards of the present invention. For example, the business premise could be an individual's telephone number, cell phone telephone number, or pager number etc. Also in the context of the present invention, the business information indicia is used for the purpose of illustrating that some form of information is provided on the auto-dial business card along with the computer readable call connection information. Thus, the business information indicia is not limited to information for a business, but could also include personal contact information or other information as a matter of design choice.

DETAILED DESCRIPTION OF THE PREFERRED EMBODIMENT

Figure 1:
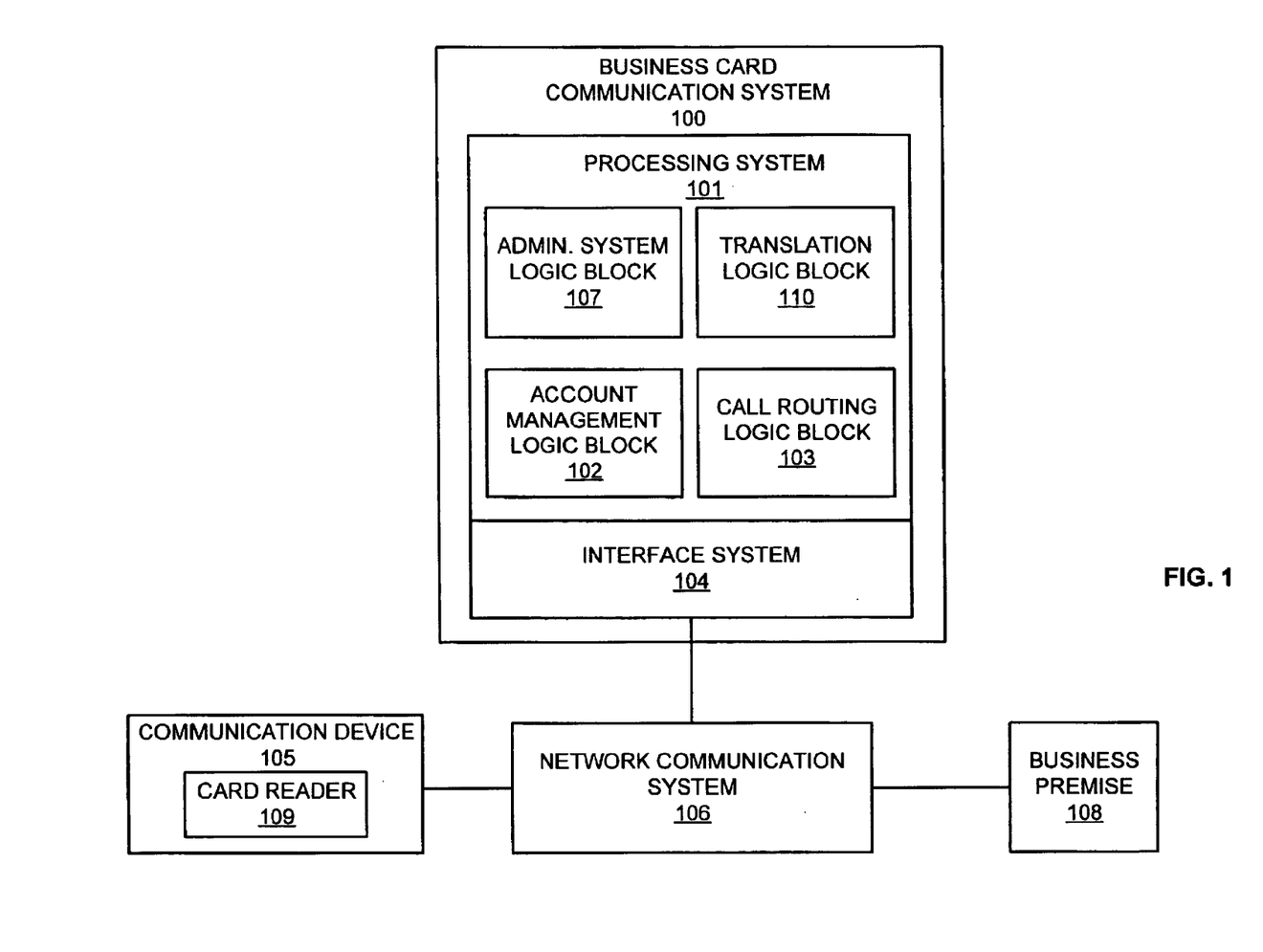
FIG. 1 illustrates an example of a system architecture for a business card communication system according to the present invention.

System Architecture FIG. 1:

FIG. 1 depicts a business card communication system 100, a network communication system 106, a business premise 108, and a communication device 105. The business card communication system 100 comprises a processing system 101 coupled to an interface system 104. The processing system 101 comprises an administrative system logic block 107, an account management logic block 102, a translation logic block 110, and a call routing logic block 103. The communication device 105 comprises a card reader 109. Alternatively, the communication device 105 could comprise a Public Telephone Network Dialing interface, such as a keypad, along with the card reader 109 to provide an alternative access interface with the communication device 105. The interface system 104 is connected to the network communication system 106. The network communication system 106 is connected to the business premise 108 and the communication device 105.

The communication device 105 could be any device or group of devices configured to receive computer readable call connection information from an auto-dial business card and process the computer readable call connection information to generate a call request for a call to the business premise 108. The communication device 105 could use the card reader 109 to receive the computer readable call connection information. Some examples of the communication device 105 include without limitation, a wireless or wireline telephone, a personal computer, a workstation, a notebook computer, a cellular telephone, a facsimile machine, a personal data assistant, as well as other devices capable of receiving or being configured to receive the computer readable call connection information from an auto-dial business card.

Figure 5A:
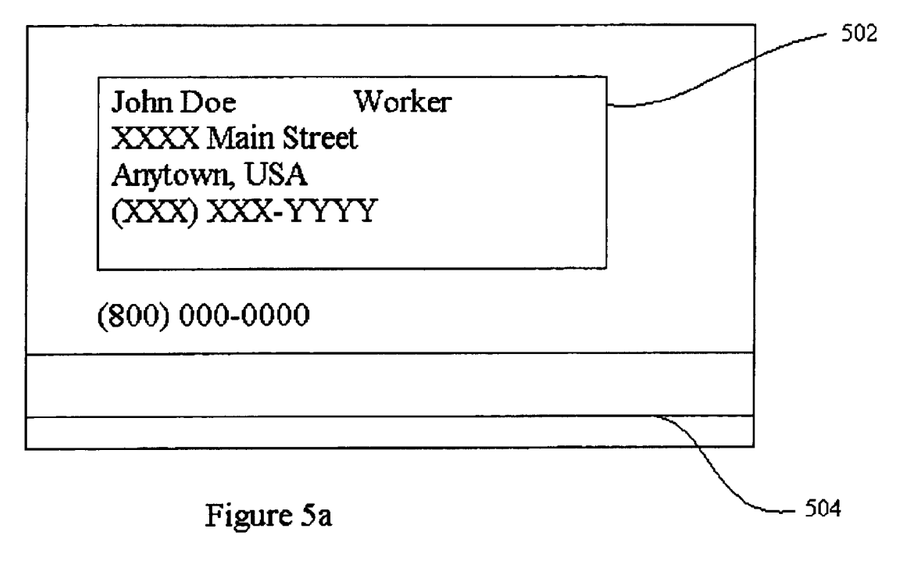
FIG. 5a is a drawing of one example embodiment of an auto-dial business card in accordance to the present invention.

The auto-dial business card could be any card or batch of cards that include business information indicia (502) and the computer readable call connection information (504). The computer readable call connection information (504) could be any information that can be received from the auto-dial business card by the communication device 105 and that permits the communication device 105 to automatically generate a call request to the business premise 108. The computer readable call connection information (504) could be included on the auto-dial business cards in any form that is acceptable by the communication device 105. For example, the computer readable call connection information (504) could be included on the auto-dial business card in a barcode or magnetic strip. In another example, the computer readable call connection information could be included on an auto-dial business card in a computer chip (not shown) readable by the card reader 109. The card reader 109 could be a conventional card reader configured to receive the computer readable call connection information from an auto-dial business card.

The business information indicia could be any information included on an auto-dial business card as a matter of design choice. Some examples of the business information indicia could include without limitation, information found on a conventional business card such as a business name, address, business logo, and electronic mail information. In the context of the present invention, the business information indicia is not limited to information about a business, but could also be personal information for an individual such as a name, telephone number, and/or email address. It should be noted that even though an auto-dial business card according to the present invention is configured to automatically place a call to the business premise 108, the telephone number for the business premise 108 could also be included in the business indicia information.

The processing system 101 could be any processor or group of processors configured to receive a call request from the communication device 105 and process the call request to generate call handling information that routes the call request to the business premise 108. The processing system 101 uses the call routing logic block 103 to generate the call handling information for the call request. The call handling information contains call routing instructions for the network communication system 106 to route the call request to the business premise 108. In some examples of the present invention, the processing system 101 could also perform administrative functions, such as account setup and management using the administrative system logic block 107 and the account management logic block 102. Those skilled in the art will appreciate that the processing system 101 could include other call processing logic blocks although only the administrative system logic block 107, the account management logic block 102, the translation logic block 110, and the call routing logic block 103 are shown on FIG. 1 for clarity.

The interface system 104 could be any device or group of devices configured to receive the call request from the communication device 105 and transmit the call handling information for the processing system 101. Although they are not shown for clarity, the interface system 104 could handle numerous links to other elements in the network communication system 106. In some examples of the present business card system 100, the interface system 104 could exchange messages in various different protocols with communication devices both internal and external to the network communication system 106. For example the interface system 104 could exchange messages in SS7 TCAP, Transmission Control Protocol/Internet Protocol (TCP/IP), and/or Asynchronous Transfer Mode Protocol (ATM). Those skilled in the art will appreciate that the interface system 104 could include other conventional components not shown on FIG. 1 for clarity.

Figure 2:
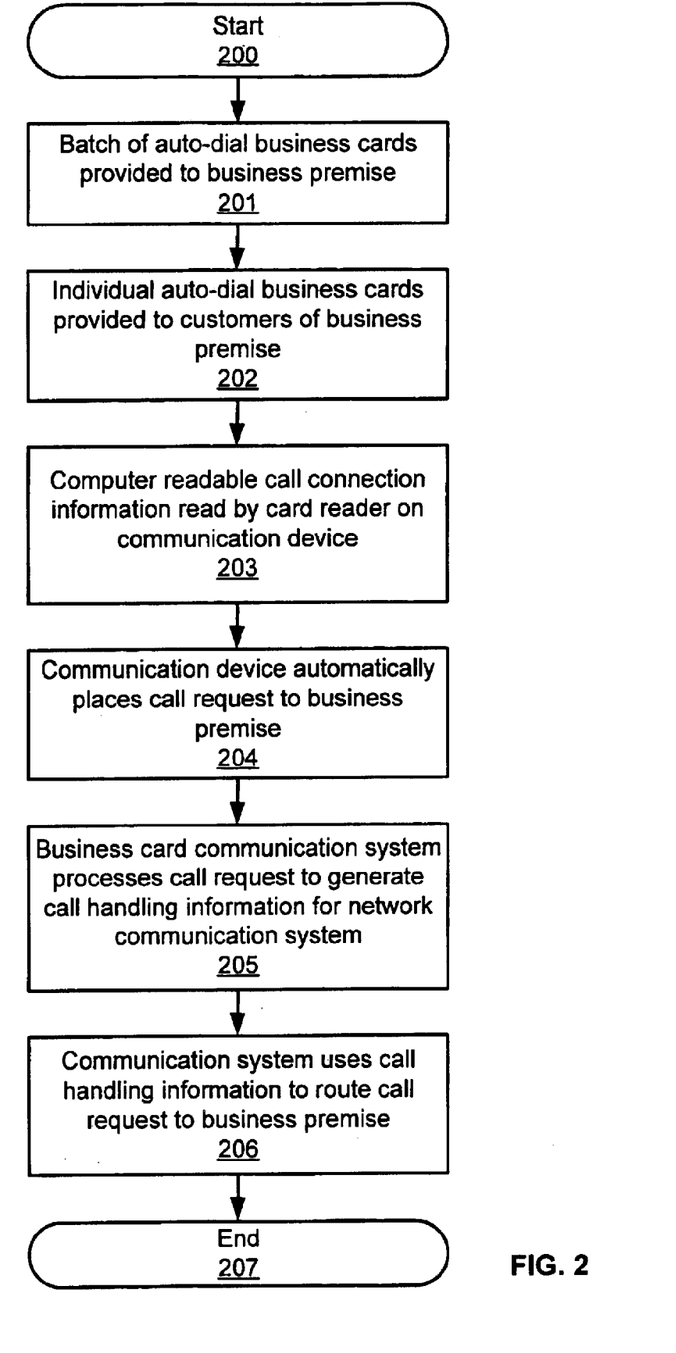
FIG. 2 is a flow chat illustrating an example of the operation of a business card communication system according to the present invention.

The network communication system 106 could be one or more communication networks that provide one or more communication services. For example, the network communication system 106 could comprise the public switched telephone network ("PSTN"). In another example of the present invention, the network communication system 106 could comprise an asynchronous transfer mode ("ATM") network or an ATM network connected to an IP network and/or the PSTN. In yet another example of the present invention, the network communication system 106 could comprise a personal communication service ("PCS") network or PCS network connected to an ATM network and/or the PSTN or other networks. Finally, the network communication system 106 could be a Local Area Network ("LAN") or a LAN network connected to a Wide Area Network "(WAN")" that is interconnected with other WANs by a data network, such as an IP, Frame Relay or ATM network. Those skilled in the art will appreciate that the network communication system 106 would include various conventional components not shown on FIG. 1 for clarity.
Business Card Communication System Operation FIG. 2:

FIG. 2 is a flow chart illustrating an example of the operation of the business card communication system 100 according to the present invention. It is anticipated however, that one skilled in the art will recognize numerous other examples in accordance with the principles described below, and thus, the following examples are for the purpose of illustration and not limitation. Those skilled in the art will also appreciate that various features described below could be combined with the above described embodiment to form multiple variations of the invention.

On FIG. 2 the operation begins at step 200. At step 201, a batch of auto-dial business cards are provided to the business premise 108 by a service provider. Each of the individual auto-dial business cards in the batch of auto-dial business cards includes the business information indicia and the computer readable call connection information for the business premise 108. At step 202, the business premise 108 provides individual auto-dial business cards from the batch of auto-dial business cards to its customers. At step 203, the card reader 109 on the communication device 105 reads the computer readable call connection information from one of the individual auto-dial business cards provided to the customers of the business premise 108. The card reader 109 could read the call connection information from a bar code, magnetic strip or computer chip on the individual auto-dial business card following insertion of the auto-dial business card into the card reader 109. In another example of the present invention, the auto-dial business card could be swiped through the card reader 109 or scanned by the card reader 109 to provide the computer readable call connection information to the communication device 105.

The computer readable call connection information could be any information that permits the communication device 105 to automatically place a call request to the business premise 108. For example, the computer readable call connection information could include an access telephone number that routes a call to the business card communication system 100. The computer readable call connection information could also include a card identifier code that identifies the individual auto-dial business card being used. The computer readable call connection information could also include a batch identifier code that identifies the batch of auto-dial business cards that the individual auto-dial business card is associated with. The computer readable call connection information could also include other information such as a customer level code that is used by the business card communication system 100 to route a call request to a specific telephone extension within the business premise 108. For example a batch of auto-dial business cards for a sales employee of the business premise 108 could route all calls to a sales telephone number at the business premise 108 using the customer level code. Another batch of auto-dial business cards for another employee of the business premise 108 could route calls directly to that employees telephone extension within the business premise 108 using the customer level code.

In response to receiving the call connection information from the auto-dial business card, the communication device 105 uses the access number to automatically place a call request to the business premise 108 over the network communication system 106, at step 204. The call request is routed by the communication network system 106 to the business card communication system 100. At step 205 the business card communication system 100 process the call request to generate call handling information for the call request and provides the call handling information to the network communication system 106. The call handling information includes instructions to route the call request to the business premise 108. At step 206, the network communication system 106 uses the call handling information to initiate a call between the communication device 105 and the business premise 108 and the operation ends at step 207.

Advantageously, the business card communication system 100 of the present invention permits a single access number to be used for multiple clients of the business card communication system 100. For example, the access number could be a toll free number that is used for a plurality of subscribers to the auto-dial business card service, with the individual call requests being routed to the appropriate call destination, e.g. business premise 108, by the business card communication system 100.

Figure 3:
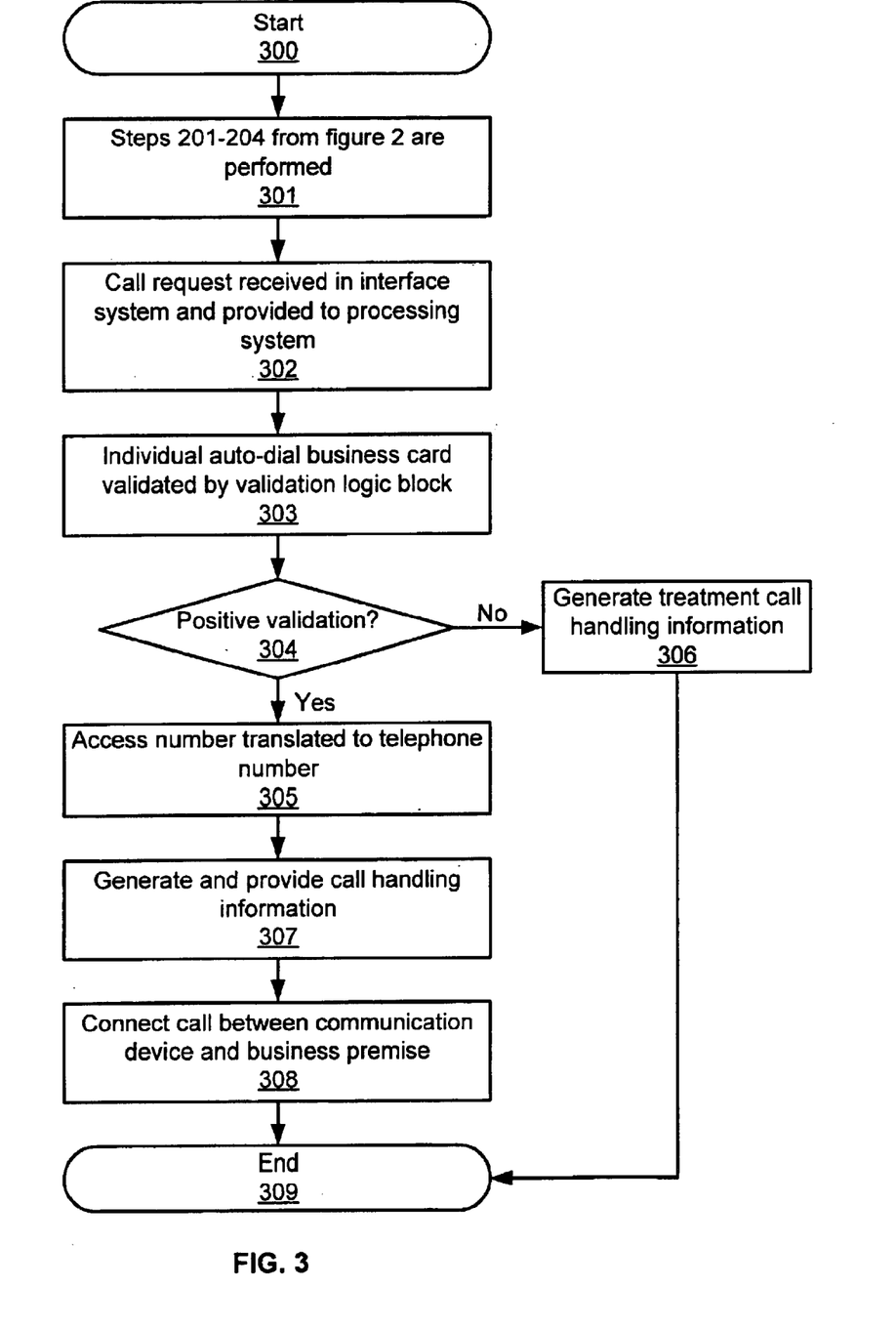
FIG. 3 is a flow chart illustrating another example of the operation of a business card communication system according to the present invention.

FIG. 3 is a flow chart illustrating an example of call request processing in the business card communication system 100. On FIG. 3 the operation begins at step 300. At step 301, steps 201 through 204 from FIG. 2 are performed to generate and provide the call request to the business communication system 100. At step 302, the call request is received in the interface system 104 and provided to the processing system 101. At step 303, the processing system 101 uses the account validation logic block 102 to validate the card identifier code for the individual auto-dial business card. The validation could be any process representative of determining if calls to the business premise 108 should be allowed. For example, if the business premise 108 discontinues the auto-dial business card service or becomes delinquent in payment of its account, the business card communication system 100 could block the call.

If a negative validation occurs at step 304, processing continues at step 306 and the processing system 101 uses the call routing logic block to generate treatment call handling information for the network communication system 106. The treatment call handling information could include instructions to block the call request. The treatment call handling information could also route the call to an operator or to a voice response unit for treatment of the call. If a positive validation occurs at step 304, processing continues at step 305. At step 305, the processing system 101 uses the translation logic block 110 to translate the access number into a telephone number for the business premise 108. The translation process is representative of determining if the call to the business premise 108 is a local call from the communication device 105 or a long distance call from the communication device 105. The translation logic block 10 could use the card identifier code to determine the location of the business premise 108 and the calling number for the communication device 105 to determine if the call is a long distance call request or local call request. If the call request is a local call request, the translation logic block 110 translates the access number to a local telephone number for the business premise 108. If the call request is for a long distance call request, the translation logic block 110 translates the access number to a long distance telephone number for the business premise 108. In some examples of the present invention, the long distance telephone number translation could be similar to a toll free number translation that permits long distance charges to be billed to the business premise 108. In other examples of the present invention, the long distance telephone number translation could be a simple translation of the access number to a long distance telephone number for the business premise 108 with charges billed to the communication device 105. Advantageously, this gives customers of the auto-dial business card service the flexibility to either provide a toll free telephone number for its customers or have long distance telephone charges paid for by its customers.

At step 307, the processing system 101 uses the call routing logic block 103 to generate call handling information that includes instructions to route the call request to the business premise 108 and provides the call handling information to the network communication system 106. At step 308, the network communication system 106 uses the call handling information to connect a call between the communication device 105 and the business premise 108 and the processing ends at step 309.

In some examples of the present business card communication system 100, the processing system 101 could also use the administrative system logic block 107 to track call requests and call durations on a card by card basis. Thus, upon termination of a call to the business premise 108, the administrative system logic block 107 could associate the call request and other call information with the card identifier code for the individual auto-dial business card and generate a record of this information for the processing system 101. Advantageously, this information could be provided to the business premise 108 for customer tracking purposes.

Figure 4:
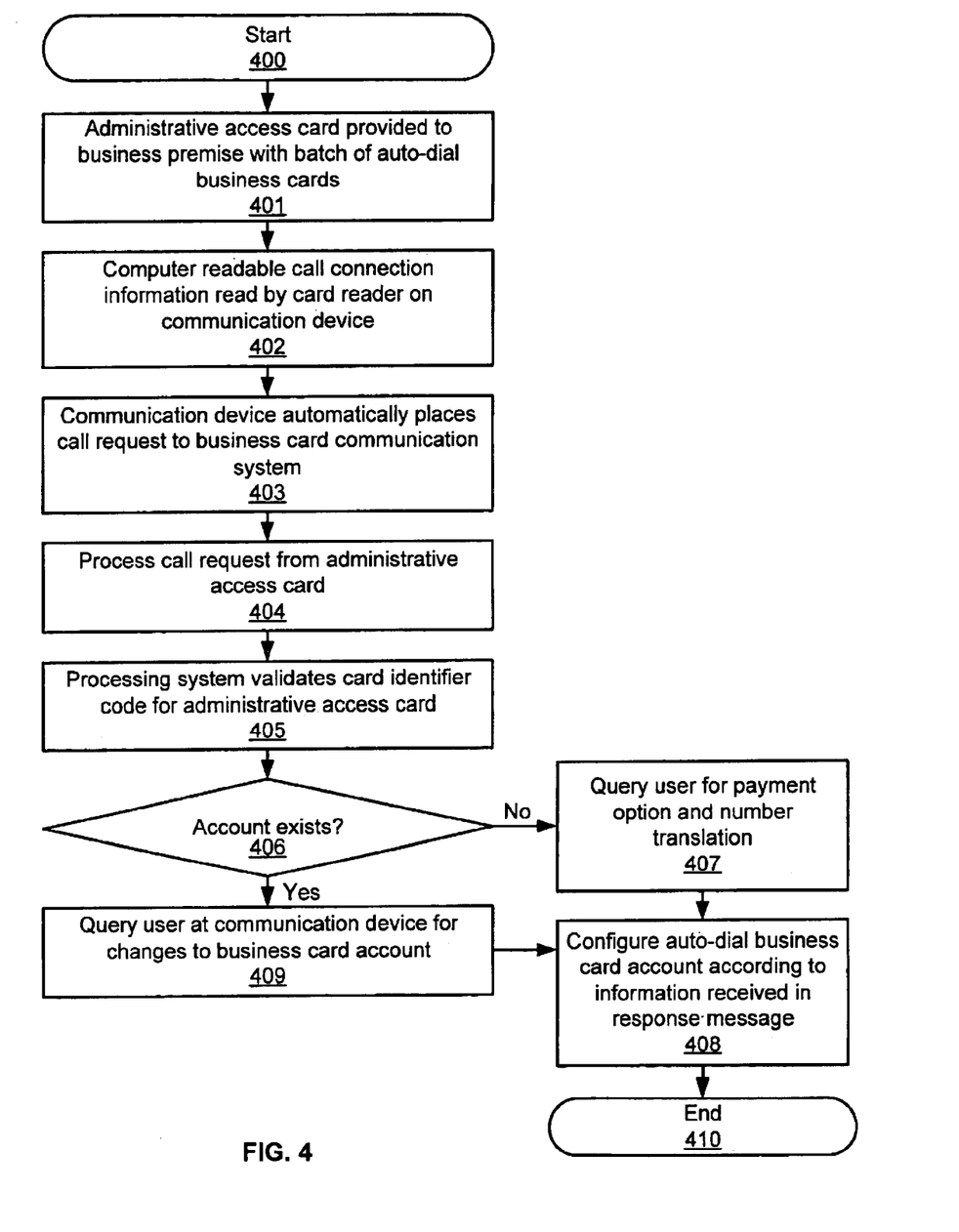
FIG. 4 is a flow chart illustrating another example of the operation of a business card communication system according to the present invention.
Figure 5B:
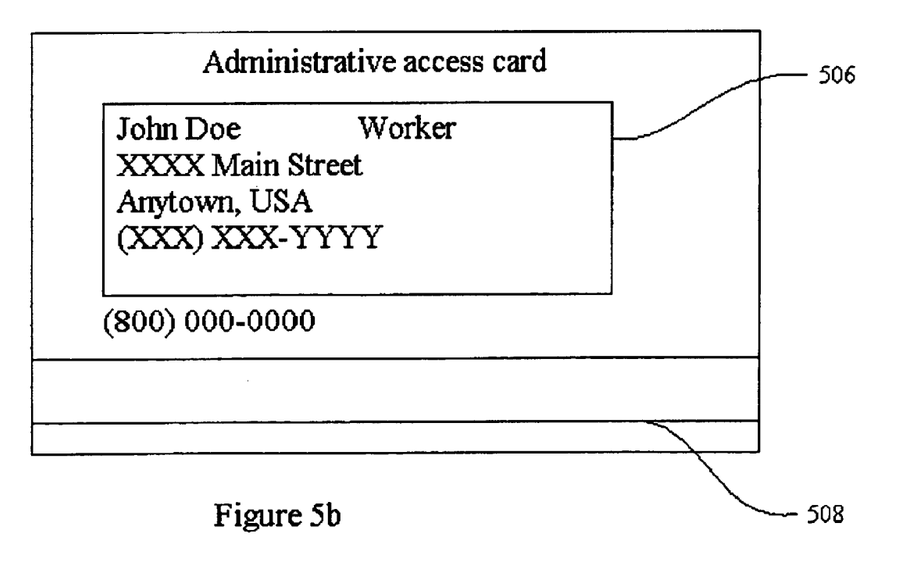
FIG. 5b is a drawing of one example embodiment of an administrative access card in accordance to the present invention.

FIG. 4 is a flow chart illustrating an example of an account setup and account management for a batch of auto-dial business cards according to the present invention. On FIG. 4 the operation begins at step 400. At step 401 an administrative access card is provided to the business premise 108 with the batch of auto-dial business cards. The administrative access card includes computer readable call connection information (508) and is used by the business premise 108 for account configuration, monitoring, and management. The computer readable call connection information (508) for the administrative access card could be any information that provides access to the business card communication system 100. For example, the computer readable call connection information (508) could include the same access number as the computer readable call connection information for the individual auto-dial business cards. The computer readable call connection (508) information for the administrative access card could also include a unique access number that identifies the card as an administrative access card to the business card communication system 100. In another example, the computer readable call connection information for the administrative access card could also include a card identifier code or other information such as billing and account access information.

At step 402, the card reader 109 on the communication device 105 reads the computer readable call connection information from the administrative access card. In response to receiving the call connection information from the administrative access card, the communication device 105 automatically places a call request to the business card communication system 100 over the network communication system 106, at step 403. At step 404, the processing system 101 processes the call request including the card identifier code and determines the call request is from an administrative access card. At step 405, the processing system 101 uses the account validation logic block 102 to validate the card identifier code for the administrative access card. The validation could be any process representative of verifying access information provided in the call request. The validation could also be any process representative of determining if an auto-dial business card account is configured for the batch of auto-dial business cards.

If an auto-dial business card account is not configured for the batch of auto-dial business cards at step 406, the processing system 101 uses the administrative system logic block 107 to generate and transmit a query message for a user at the communication device 105. The query message includes a request for a payment option and at least one number translation at step 407. For example, the payment option could be a credit card or business credit account and the at least one number translation could be a long distance telephone number and/or a local telephone number for the business premise 108. At step 408, the processing system 101 processes a response message from the communication device 105 to configure an auto-dial business card account for the user according to the information received in the response message and the processing ends at step 410.

If an auto-dial business card account is configured for the batch of auto-dial business cards at step 406, the processing system 101 uses the administrative system logic block 107 to generate and transmit a query message for the user at the communication device 105 requesting changes to the auto-dial business card account at step 409. The changes could include a new payment option or a new number translations for the business premise 108. The changes could also include changes to other features of the auto-dial business card account such as requests for additional auto-dial business cards, account cancellation etc. In another example of the present business card communication system 100, the processing system 101 could also provide options for the user at the communication device 105 to obtain the usage tracking information for the auto-dial business cards. In yet another example of the present business card communication system 100, the processing system 101 could provide other information such as account balances and statements via an account status message. Those skilled in the art will appreciate that the processing system 101 could be configured to send the query and status messages using different methods depending on the type of communication device. For example, if the communication device 105 is a conventional wireless or wireline telephone, the processing system 101 could use a voice response unit to send a voice message over the bearer channel. In another example, where the communication device 105 includes a text display, the processing system 101 could query the user at the communication device 105 with a text message. At step 408, the processing system 101 processes a response message from the communication device 105 to configure the auto-dial business card account according to the information received in the response message and the processing ends at step 410.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

I claim:

1. A method for providing a telecommunications service comprising:

providing a batch of auto-dial business cards to customers, wherein each one of the individual auto-dial business cards in the batch of auto-dial business cards includes business information indicia and a first computer readable call connection information for a business premise;

providing an administrative access card associated with the batch of auto-dial business cards, wherein the administrative access card includes a second computer readable call connection information for a business card communication system;

automatically reading the second computer readable call connection information from the administrative access cards using a communication device; and responsive to reading the second computer readable call connection information from the administrative access card, automatically initiating a call to the business card communication system.

2. The method of claim 1 wherein automatically reading the second computer readable call connection information from the administrative access card comprises:

reading the second computer readable call connection information from a bar code on the administrative access card.

3. The method of claim 1 wherein automatically reading the second computer readable call connection information from the administrative access card comprises:

reading the second computer readable call connection information from a magnetic strip on the administrative access card.

4. The method of claim 1 wherein automatically initiating the call to the business card communication system comprises automatically dialing the access number included in the second computer readable call connection information.

5. The method of claim 4 wherein automatically initiating the call to the administrative system comprises:

responsive to dialing the access number, validating the administrative access card using a card identifier included in the call connection information.

6. The method of claim 5 the method further comprising:

responsive to validating the administrative access card, determining if an auto-dial business card account is configured for the batch of auto-dial business cards;

responsive to a determination that the auto-dial business card account is configured for the batch of auto-dial business cards, generating and transmitting a first query message for the communication device that includes a request for configuration changes to the auto-dial business card account;

responsive to a determination that the auto-dial business card account is not configured for the batch of auto-dial business cards, generating and transmitting a second query message for the communication device that includes a request for a payment option and at least one number translation, and configuring the auto-dial business card account according to a response message from the communication device.

7. The method of claim 5 the method further comprising:

responsive to validating the administrative access card, determining if an auto-dial business card account is configured for the batch of auto-dial business cards;

responsive to a determination that the auto-dial business card account is configured for the batch of auto-dial business cards, generating and transmitting a status message that includes auto-dial business card account information to the communication device.

8. A communication system comprising:

a communication device configured to read a first computer readable call connection information from one of a plurality of auto-dial business card contained in a batch of auto-dial business cards and process the first computer readable call connection information to automatically initiate a call request to a business premise, wherein each one of the plurality of auto-dial business cards includes business information indicia and the first computer readable call connection information;

a business card communication system comprising a processing system configured to process the call request from the communication device to translate an access number provided in the call request and generate call handling information that routes the call request to the business premise;

an interface system coupled to the processing system and configured to receive the call request from the communication device and transmit the call handling information for the processing system;

the communication device configured to read a second computer readable call connection information from an administrative access card associated with the batch of auto-dial business cards and process the second computer readable call connection information to automatically place a second call request to the processing system.

9. The system of claim 8 wherein the processing system is configured to track usage of each of the plurality of auto-dial business cards included in the batch of auto-dial business cards on a card by card basis.

10. The system of claim 8 wherein the processing system is configured to process the second call request to validate the administrative access card using a second card identifying code included in the second call request.

11. The system of claim 10 wherein the processing system is further configured to determine if an auto-dial business card account is configured for the batch of auto-dial business cards responsive to validation of the administrative access card, and generate and transmit a query message for the communication device.

12. The system of claim 11 wherein in response to a determination that the auto-dial business card account is configured for the batch of auto-dial business cards, the query message includes a request for configuration changes to the auto-dial business card account.

13. The system of claim 11 wherein in response to a determination that the auto-dial business card account is not configured for the batch of auto-dial business cards, the query message includes a request for a payment option and at least one number translation.

14. The system of claim 13 wherein the processing system is configured to process a response message from the communication device that includes the payment option and the at least one number translation to configure the auto-dial business card account according to information provided in the response message, and the interface system is configured to receive the response message for the processing system.

15. The system of claim 11 wherein in response to the determination that the auto-dial business card account is configured for the batch of auto-dial business cards, the processing system is configured to generate a status message that includes auto-dial business card account information for the communication device.

* * * * *